(12) United States Patent
Lan

(10) Patent No.: US 11,137,613 B2
(45) Date of Patent: Oct. 5, 2021

(54) ADJUSTING APPARATUS AND HEAD-MOUNTED DISPLAY DEVICE

(71) Applicant: GOERTEK TECHNOLOGY CO., LTD., Qingdao (CN)

(72) Inventor: Xiangdong Lan, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/764,360

(22) PCT Filed: Dec. 18, 2017

(86) PCT No.: PCT/CN2017/117042
§ 371 (c)(1),
(2) Date: May 14, 2020

(87) PCT Pub. No.: WO2019/100481
PCT Pub. Date: May 31, 2019

(65) Prior Publication Data
US 2020/0310137 A1    Oct. 1, 2020

(30) Foreign Application Priority Data
Nov. 24, 2017   (CN) .......................... 201711195089.1

(51) Int. Cl.
*G02B 27/01*    (2006.01)
(52) U.S. Cl.
CPC ..... *G02B 27/0176* (2013.01); *G02B 27/0101* (2013.01); *G02B 27/0149* (2013.01);
(Continued)
(58) Field of Classification Search
CPC ............ G02B 27/0176; G02B 27/0101; G02B 27/0149; G02B 27/0172; G02B 2027/011; G02B 2027/0161; G02B 2027/0178
See application file for complete search history.

(56) References Cited

U.S. PATENT DOCUMENTS 5,451,976 A * 9/1995 Ito ........................ G02B 27/017
345/8
5,486,841 A * 1/1996 Hara ........................ G02B 7/12
345/8
(Continued)

FOREIGN PATENT DOCUMENTS

CN          104898282 A        9/2015
CN          205333966 U        6/2016
(Continued)

OTHER PUBLICATIONS

CN Office Action in application No. 201711195089.1 dated Apr. 23, 2019.

*Primary Examiner* — Nitin Patel
*Assistant Examiner* — Robert M Stone
(74) *Attorney, Agent, or Firm* — Maschoff Brennan

(57) ABSTRACT

An adjusting apparatus and a head-mounted display device, which includes: a runner, an interpupillary distance adjusting component and an object distance adjusting component; where, the interpupillary distance adjusting component includes: a first screw, and an interpupillary distance adjusting actuator engaged with the first screw; the object distance adjusting component includes: a second screw, and an object distance adjusting actuator engaged with the second screw; a through hole is formed on a center of the runner, the through hole, and the first screw and the second screw are coaxial; when the runner moves onto the first screw, the runner is connected with the first screw through a connection structure, and the runner drives the first screw to rotate together; when the runner moves onto the second screw, the runner is connected with the second screw through a connection structure, and the runner drives the second screw to rotate together.

20 Claims, 5 Drawing Sheets

(52) U.S. Cl.
CPC .... *G02B 27/0172* (2013.01); *G02B 2027/011* (2013.01); *G02B 2027/0161* (2013.01); *G02B 2027/0178* (2013.01)

(56) References Cited

U.S. PATENT DOCUMENTS

| | | | | |
|---|---|---|---|---|
| 5,752,276 | A * | 5/1998 | Baudou | A42B 3/042 2/422 |
| 5,815,126 | A * | 9/1998 | Fan | G02B 27/017 345/7 |
| 5,880,773 | A * | 3/1999 | Suzuki | G02B 7/12 348/115 |
| 6,084,555 | A * | 7/2000 | Mizoguchi | G02B 7/12 345/8 |
| 6,704,141 | B1 * | 3/2004 | Nowak | G02B 7/002 359/411 |
| 8,605,008 | B1 * | 12/2013 | Prest | G02B 27/0176 345/8 |
| 8,847,851 | B2 * | 9/2014 | Yamamoto | G02B 27/0172 345/8 |
| 9,518,694 | B2 * | 12/2016 | Kori | F16M 11/18 |
| 10,216,214 | B2 * | 2/2019 | Park | G05G 1/10 |
| 10,535,320 | B2 * | 1/2020 | Namkung | G02B 27/017 |
| 10,725,305 | B2 * | 7/2020 | Tempel | G02B 27/0176 |
| 10,852,550 | B2 * | 12/2020 | Lee | G02B 27/0006 |
| 2014/0098009 | A1 * | 4/2014 | Prest | G02B 27/0172 345/8 |
| 2015/0138645 | A1 * | 5/2015 | Yoo | G02B 27/0149 359/630 |
| 2016/0246059 | A1 * | 8/2016 | Halpin | G02B 27/0176 |
| 2016/0334627 | A1 * | 11/2016 | Yang | G02B 27/01 |
| 2017/0102549 | A1 * | 4/2017 | Lee | G02B 27/0172 |
| 2019/0113171 | A1 * | 4/2019 | Zhang | F16H 25/20 |
| 2021/0041909 | A1 * | 2/2021 | Ahn | G02B 27/0176 |

FOREIGN PATENT DOCUMENTS

| | | |
|---|---|---|
| CN | 106066539 A | 11/2016 |
| CN | 205809426 U | 12/2016 |
| CN | 107272205 A | 10/2017 |
| CN | 207557583 U | 6/2018 |

* cited by examiner

ADJUSTING APPARATUS AND HEAD-MOUNTED DISPLAY DEVICE

CROSS-REFERENCE TO RELATED APPLICATIONS

The present disclosure refers to Chinese Patent Application No. 201711195089.1, filed on Nov. 24, 2017, entitled "an adjusting apparatus and a head-mounted display device", which is hereby incorporated by reference in its entirety.

TECHNICAL FIELD

The present disclosure relates to the technical field of wearable devices, and in particular to an adjusting apparatus and a head-mounted display device.

BACKGROUND

With the development of VR (short for virtual reality)/AR (short for Augmented Reality) technology, many VR/AR head-mounted devices have appeared on the market. The VR/AR head-mounted device is a device for displaying images and colors, usually in the form of an eye mask or a helmet, to make the display screen close to the user's eyes, and project the picture to the eyes within a close distance by adjusting the focal length through the optical path. In order to meet the needs of users with short-sighted/far-sighted, currently used head-mounted device is able to adjust the interpupillary distance (distance between the left/right lens cones) individually, adjust the object distance (distance between the display and the eyes) individually, or adjust both the interpupillary distance and the object distance.

However, the currently used head-mounted device needs to be adjusted through two sets of mechanisms and two trigger buttons when adjusting the interpupillary distance and object distance. Since the two trigger buttons are operated separately, it is difficult to meet a synchronization of the left/right lens cones. The poor adjustment accuracy may also easily cause the problems such as the adjustment mechanism stuck or the display screen tilting, which seriously affects the visual effect. Moreover, the user is inconvenient to adjust after wearing, and it is difficult to use.

SUMMARY

In view of so, the present disclosure provides an adjusting apparatus and a head-mounted display device, which achieve the interpupillary distance adjustment and the object distance adjustment by only one part, and is convenient for the user to use.

To solve the technical problem in the prior arts, the present disclosure provides an adjusting apparatus, including: a runner, an interpupillary distance adjustment component, and an object distance adjustment component; where, the interpupillary distance adjustment component includes: a first screw, and an interpupillary distance adjustment actuator engaged with the first screw;

the object distance adjustment component includes: a second screw, an object distance adjustment actuator engaged with the second screw;

a through hole is formed on a center of the runner, the through hole, the first screw and the second screw are coaxial, and the runner is capable of moving on the first screw and the second screw along an axis direction;

when the runner moves onto the first screw, the runner is connected with the first screw through a connection structure, and the runner drives the first screw to rotate together; and when the runner moves onto the second screw, the runner is connected with the second screw through the connection structure, and the runner drives the second screw to rotate together.

Optionally, the connection structure includes: an elastic insertion member and a groove cooperating with the elastic insert; where, the elastic insertion member is disposed on a hole wall of the through hole of the runner, and the first screw and the second screw are provided with the groove; or the first screw and the second screw are provided with the elastic insertion member, and the hole wall of the through hole of the runner is provided with the groove.

Optionally, the elastic insertion member is an elastic pin or an elastic bead.

Optionally, the interpupillary distance adjustment actuator includes: a first gear, a second gear, a first rack, and a second rack; where, the first gear and the second gear are connected by a straight rod;

the first gear is engaged with the first screw;

the first rack is parallel to the second rack; and the second gear is located between the first rack and the second rack, and is engaged with the first rack and the second rack respectively.

Optionally, the object distance adjustment actuator includes: a transmission rod, an actuator rod and a pushing member;

the transmission rod is provided with a first bevel gear and a third gear engaged with the second screw;

the actuator rod is provided with a second bevel gear engaged with the first bevel gear;

the pushing member is threadedly connected with the actuator rod; and the second screw drives the third gear to rotate, the third gear drives the first bevel gear to rotate, and the second bevel gear drives the actuator rod to rotate, such that the pushing member moves along an axis direction of the actuator rod.

Optionally, the adjusting apparatus, further includes: a runner pushing plate;

a runner hole is formed on the runner pushing plate, and two opposite sides of the runner hole are provided with two pushing plates in parallel; and the runner enters a gap between the two pushing plates through the runner hole, and the runner is parallel to the two pushing plates.

Correspondingly, the present disclosure further provides a head-mounted display device, including a first lens cone, a second lens cone, a display and the adjustment apparatus as above;

where, the first lens cone and the second lens cone are connected with the interpupillary distance adjustment actuator;

the display is connected with the object distance adjustment actuator;

when the runner drives the first screw to rotate together, an interpupillary distance between the first lens cone and the second lens cone is adjusted;

when the runner drives the second screw to rotate together, an object distance between the display and the first lens cone and the second lens cone is adjusted.

Optionally, the object distance adjustment actuator includes a pushing member;

the display is provided with a connection groove, and the pushing member is fixedly installed in the connection groove.

Optionally, the head-mounted display device further includes: a front case, a partition plate with a display port, a middle case with an operation hole, and a rear case with a mirror hole; where, the partition plate separates the middle case into a display cavity and a lens cone cavity, the front case is connected with the middle case and covers and fits the display cavity, and the rear case is connected with the middle case and covers and fits the lens cone cavity;

in the lens cone cavity, the partition plate is provided with a first connection portion, the rear case is provided with a second connection portion, one end of the first screw is connected with the first connection portion, the other end is sleeved with the second screw, the other end of the second screw is connected with the second connection portion, and a control part partly extends outward from the operation hole;

the display is disposed in the display cavity and movably connected with the middle case; and the first lens cone and the second lens cone are disposed in the lens cone cavity and movably connected with the middle case.

Further optionally, the adjusting apparatus includes a runner pushing plate;

the runner pushing plate is movably connected with the middle case; and two pushing plates of the runner pushing plate extend outward from the operation hole.

In the technical solution of the present disclosure, by switching the connects of the runner with the first screw or the second screw, the control of the interpupillary distance adjustment actuator and the object distance adjustment actuator may be switched, and the interpupillary distance adjustment or the object distance adjustment is achieved thereby. The adjustment mechanism provided by the present disclosure has a simple structure, takes up little space, and has few operation parts. The interpupillary distance adjustment or the object distance adjustment may be achieved by only one part. The operation process is simple and convenient, allowing users with different eye sights to use the head-mounted display device in a great convenience.

BRIEF DESCRIPTION OF THE DRAWINGS

In order to describe the technical solutions in the embodiments of the present disclosure or the prior art more clearly, the drawings required to be used for descriptions about the embodiments or the prior art will be simply introduced below. It is apparent that the drawings described below are some embodiments of the present disclosure. Those of ordinary skill in the art may further obtain other drawings according to these drawings without creative work.

The drawings described herein are used to provide a further understanding of the present disclosure and constitute a part of the present disclosure. The example embodiments of the present disclosure and the descriptions thereof are used to explain the present disclosure, and do not constitute an improper limitation on the present disclosure.

In the drawings:

FIG. 1 is a schematic view of an exploded structure of an adjustment apparatus according to the present disclosure;

FIG. 2 is a schematic view of a structure of a first screw according to the present disclosure;

FIG. 3 is a schematic view of a structure of a second screw according to the present disclosure;

FIG. 4 is a schematic view of a structure of an interpupillary distance adjustment component according to the present disclosure;

FIG. 5 is a schematic view of a structure of an object distance adjustment component according to the present disclosure;

FIG. 6 is a schematic view of a structure of a runner pushing plate according to the present disclosure;

FIG. 7 is a schematic view of an exploded structure of a head-mounted display device according to the present disclosure;

FIG. 8 is a schematic view of a three-dimensional structure of a head-mounted display device according to the present disclosure;

FIG. 9 is a schematic view of a planar structure of a head-mounted display device according to the present disclosure;

FIG. 10 is a schematic view of a position of a runner when adjusting an interpupillary distance according to the present disclosure;

FIG. 11 is a cross-sectional view of FIG. 10 along the A-A direction in FIG. 9;

Figure 9:
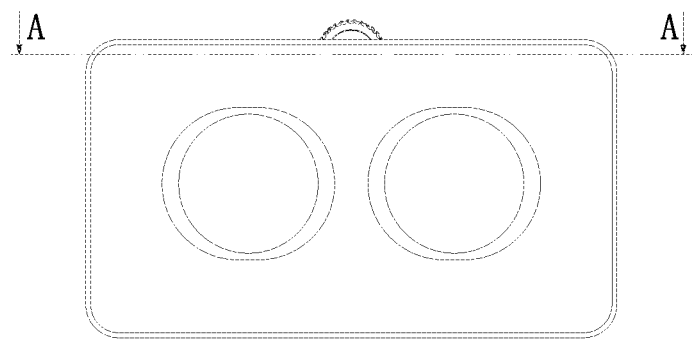
Figure 12:
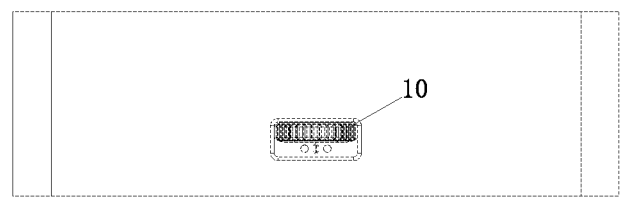
Figure 13:
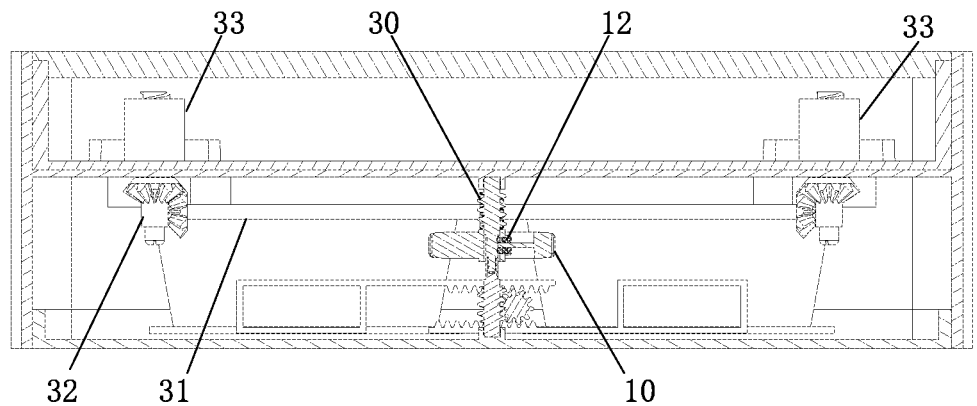

FIG. 12 is a schematic view of a position of a runner when adjusting an object distance according to the present disclosure; and FIG. 13 is a cross-sectional view of FIG. 12 along the A-A direction in FIG. 9.

DESCRIPTION OF REFERENCE NUMERALS

10: runner; 11: through hole; 12: elastic insertion member; 13: groove;
20: first screw; 21: first gear; 22: second gear; 23: first rack; 24: second rack;
30: second screw; 31: transmission rod; 32: actuator rod; 33: pushing member; 34: first bevel gear; 35: third gear; 36: second bevel gear;
40: runner pushing plate; 41: runner hole; 42: pushing plate;
50: first lens cone; 51: second lens cone; 52: display; 53: connection groove; 54: front case; 55: middle case; 56: rear case.

DETAILED DESCRIPTION OF EXAMPLE EMBODIMENTS

For making the purposes, technical solutions and advantages of the embodiments of the present disclosure clearer, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

In some of the processes described in the description, claims, and the above drawings of the present disclosure, a plurality of operations occurring in a particular order are included, which may be performed out of the order herein or be performed in parallel. The sequence numbers of the operations, such as 101, 102, etc., are merely used to distinguish between the various operations, and the sequence numbers themselves do not represent any order of execution. In addition, the processes may include more or fewer operations, and the operations may be performed sequentially or in parallel. It should be noted that the expressions herein of "first", "second", etc. are intended to distinguish between different messages, devices, modules, etc., and are not intended to represent a sequential order, nor is it intended to limit that "first" and "second" are of different types.

In the process of implementing the present disclosure, the inventor found that the currently used head-mounted display device needs two sets of mechanisms and two trigger buttons to adjust the interpupillary distance and the object distance. The adjustment operation is complex, and the user selecting the wrong adjustment button happens frequently, which seriously affects the visual effect.

Therefore, in order to solve the defects in the prior art, the present disclosure provides an adjustment apparatus and a head-mounted display device, which achieve the interpupillary distance adjustment and the object distance adjustment by only one part, and is convenient for the user to use.

The implement of the present disclosure will be described in detail with reference to the accompanying drawings and embodiments, so as to fully understand and implement the implementation process of how to apply technical means to solve technical problems and achieve technical effects in the present disclosure. The structure of the present disclosure is further described below with reference to the drawings.

Embodiment 1

Figure 1:
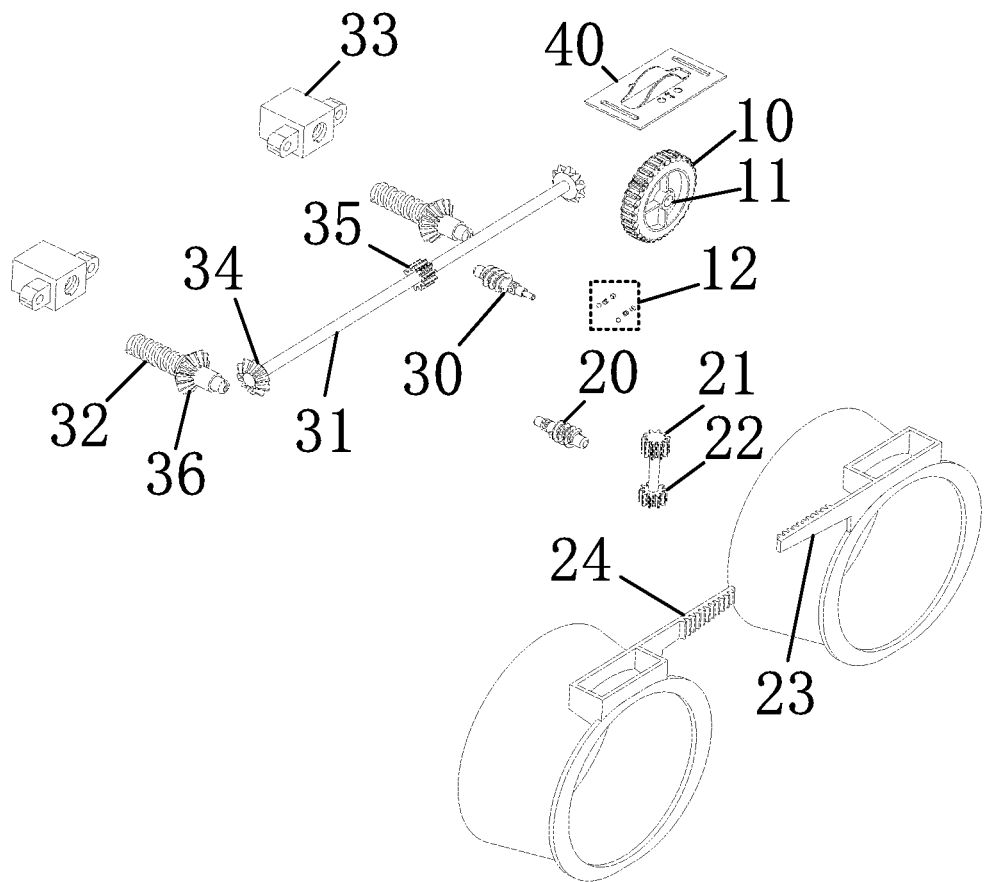

FIG. 1 is a schematic view of an exploded structure of an adjustment apparatus according to the present disclosure, as shown in FIG. 1.

The present disclosure provides an adjustment apparatus, which includes a runner 10, an interpupillary distance adjustment component, and an object distance adjustment component.

The interpupillary distance adjustment component includes: a first screw 20, and an interpupillary distance adjustment actuator engaged with the first screw 20.

The object distance adjustment component includes: a second screw 30, and an object distance adjustment actuator engaged with the second screw 30.

A through hole 11 is formed on a center of the runner 10. The through hole 11, the first screw 20 and the second screw 30 are coaxial, and the runner 10 is capable of moving on the first screw 20 and the second screw 30 along an axis direction.

When the runner 10 moves onto the first screw 20, the runner 10 is connected with the first screw 20 through a connection structure, and the runner 10 drives the first screw 20 to rotate together. When the runner 10 moves onto the second screw 30, the runner is connected with the second screw 30 through the connection structure, and the runner 10 drives the second screw 30 to rotate together.

When the runner 10 drives the first screw 20 to rotate together, the first screw 20 may control the interpupillary distance adjustment actuator to adjust the interpupillary distance. When the runner 10 drives the second screw 30 to rotate together, the second screw 30 may control the object distance adjustment actuator to adjust the object distance. In the technical solution provided by the present disclosure, by switching the connects of the runner 10 with the first screw 20 or the second screw 30, the interpupillary distance adjustment actuator and the object distance adjustment actuator may be controlled by only the runner 10, and the interpupillary distance adjustment or the object distance adjustment is then conducted. The adjustment mechanism provided by the present disclosure has a simple structure, takes up little space, and has few operation parts. The interpupillary distance adjustment or the object distance adjustment may be achieved by only one part. The operation process is simple and convenient, allowing users with different eye sights to use the head-mounted display device in a great convenience.

The adjustment apparatus provided by the present disclosure will be described in further detail below.

Figure 2:
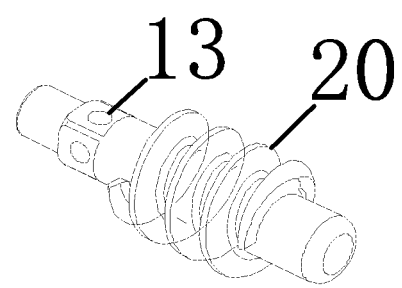
Figure 3:
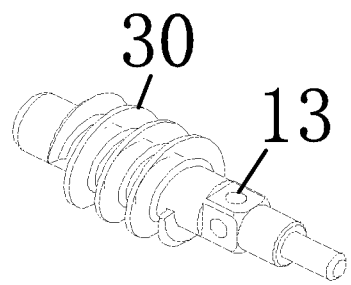

Referring to FIGS. 1 to 3, the connection structure includes: an elastic insertion member 12 and a groove 13 cooperating with the elastic insertion member 12. The elastic insertion member 12 includes but is not limited to an elastic pin or an elastic bead.

One possible way is that the elastic insertion member 12 is disposed on a hole wall of the through hole 11 of the runner 10, and the first screw 20 and the second screw 30 are provided with grooves 13.

Taking the elastic insertion member 12 as an elastic bead as an example, the elastic bead includes a fixing member, a spring and a ball. The hole wall of the through hole 11 of the runner 10 is provided with a connection groove 53. The fixing member is fixedly connected in the connection groove 53, and the spring is disposed between the fixing member and the ball. The ball is disposed at a notch of the connection groove 53. A size of the notch of the connection groove 53 is smaller than a size of the ball, and the ball may partially extend outward from the notch. In addition, the fixing member may also be omitted, the spring is fixed in the connection groove 53, and the ball is disposed between the notch and the spring.

There may be a plurality of elastic beads, which are evenly distributed on the hole wall of the through hole 11 of the runner 10 along a circumferential direction. For example, there are two elastic beads, which may be a first elastic bead and a second elastic bead respectively, the first elastic bead and the second elastic bead are disposed side by side along the axial direction of the through hole 11 of the runner 10. Correspondingly, there are a plurality of grooves 13. The plurality of grooves 13 are evenly distributed on positions on the first screw 20 matching the elastic beads, and the plurality of grooves 13 are evenly distributed on positions on the second screw 30 matching the elastic beads.

Taking the runner 10 being connected with the first screw 20 as an example, when the runner 10 moves on the first screw 20, the ball in the elastic ball is compressed into the connection groove 53 of the first screw 20. When the runner 10 moves to the position of the groove 13, the ball in the elastic bead extends into the groove 13, and the first screw 20 may be driven to rotate by the elastic bead when the runner 10 rotates.

Of course, in addition to the above-mentioned arrangement, the connection structure also includes another achievable way. The first screw 20 and the second screw 30 are provided with elastic insertion members 12, and the hole wall of the through hole 11 of the runner 10 is provided with the groove 13. The above two methods may be used in combination, which is not specifically limited here.

Figure 4:
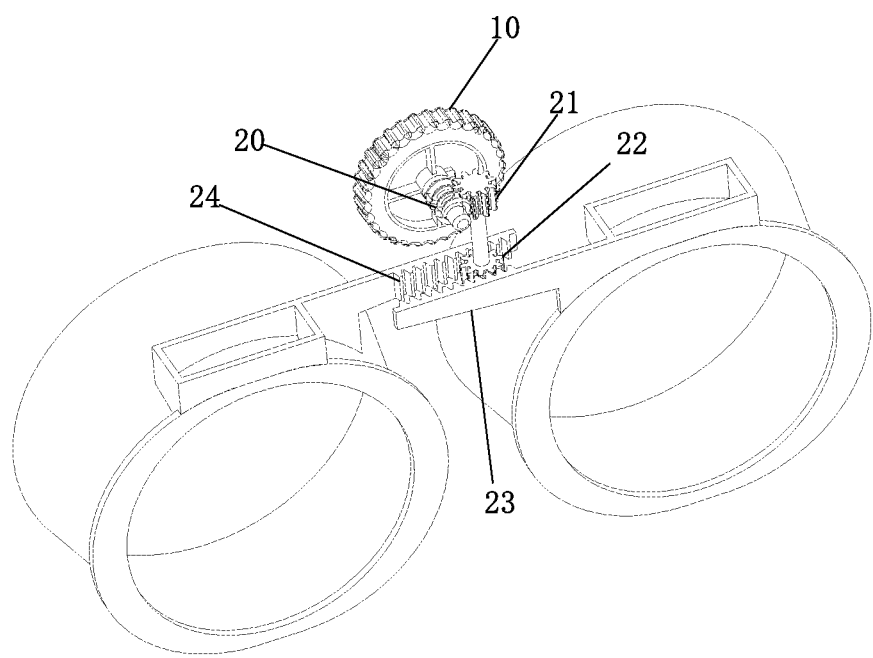

In the present disclosure, in order to realize the adjustment of the interpupillary distance, one possible way is as follow. Referring to FIG. 1 and FIG. 4, the interpupillary distance adjustment actuator includes: a first gear 21, a second gear 22, a first rack 23, and a second rack 24. The first gear 21 and the second gear 22 are connected by a straight rod. The first gear 21 is engaged with the first screw 20. The first rack 23 is parallel to the second rack 24. The second gear 22 is located between the first rack 23 and the second rack 24, and is engaged with the first rack 23 and the second rack 24 respectively.

Specifically, the runner 10 is connected with the first screw 20 through a connection structure. When the runner 10 drives the first screw 20 to rotate together, the first screw 20 drives the first gear 21 to rotate, and the second gear 22 rotates synchronously with the first gear 21. When the runner 10 rotates in different directions (clockwise or counterclockwise), the second gear 22 may be driven to rotate in different directions. When the second gear 22 rotates in different directions, the first rack 23 and the second rack 24 engaged therewith are driven to move away from each other or towards to each other. In actual use, the first rack 23 and the second rack 24 are respectively connected with different lens cones, and when the first rack 23 and the second rack 24 move away from each other or towards to each other, the interpupillary distance adjustment between different lens cones is achieved.

Continuing to refer to FIG. 4, the first screw 20 is vertically disposed with the straight rod connecting the first gear 21 and the second gear 22. The first screw 20 outputs power to the first gear 21 in various ways. One possible way is that the first screw 20 includes a threaded tooth, and the first gear 21 is a spur gear. When the threaded tooth rotates, the spur gear may be driven to rotate. Another possible way is as that the first screw 20 includes bevel tooth, and the first gear 21 is a bevel gear.

The second gear 22, the first rack 23 and the second rack 24 engaged with the second gear 22 are spur gears, which may ensure the smoothness of the movement when adjusting the interpupillary distance.

Figure 5:
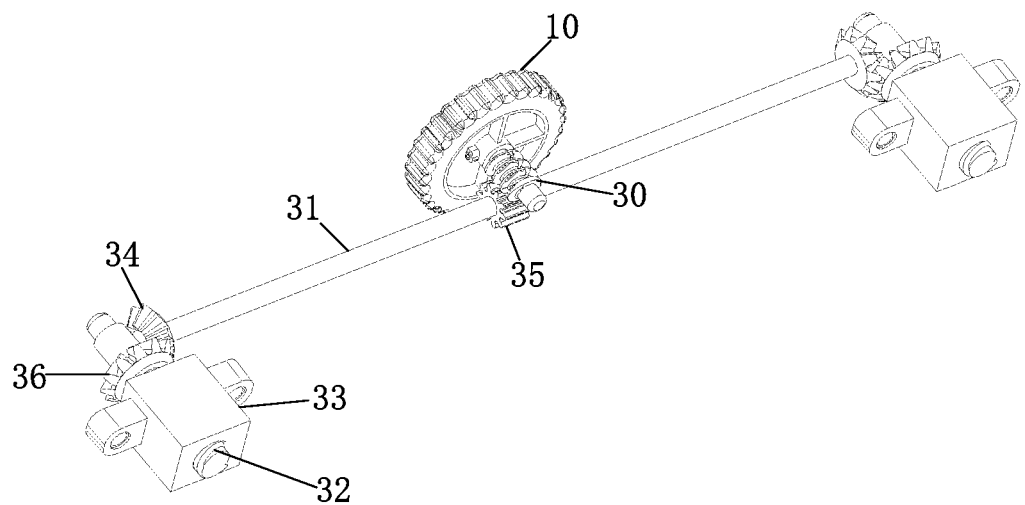

In the present disclosure, in order to achieve the adjustment of the object distance, one possible way is as follow. Referring to FIG. 1 and FIG. 5, the object distance adjustment actuator includes: a transmission rod 31, an actuator rod 32 and a pushing member 33. The transmission rod 31 is provided with a first bevel gear 34 and a third gear 35 engaged with the second screw 30. The actuator rod 32 is provided with a second bevel gear 36 engaged with the first bevel gear 34. The pushing member 33 is threadedly connected with the actuator rod 32.

The second screw 30 drives the third gear 35 to rotate, the third gear 35 drives the first bevel gear 34 to rotate, and the second bevel gear 36 drives the actuator rod 32 to rotate, such that the pushing member 33 moves along the axis direction of the actuator rod 32.

Specifically, the runner 10 is connected with the second screw 30 through a connection structure. When the runner 10 drives the second screw 30 to rotate together, the second screw 30 drives the third gear 35 to rotate, the first bevel tooth rotates synchronously with the third gear 35, the first bevel tooth drives the second bevel tooth to rotate, so as to realize the rotation of the actuator rod 32. When the runner 10 rotates in different directions (clockwise or counterclockwise), the actuator rod 32 is driven to rotate in different directions. When the actuator rod 32 rotates in different directions, the pushing member 33 may be driven to reciprocate along the axis direction of the actuator rod 32. In actual use, the pushing member 33 is connected with the display 52. When the pushing member 33 reciprocates along the axis direction of the actuator rod 32, the display 52 may be driven to reciprocate along the axis direction of the actuator rod 32 to achieve the adjustment of the object distance of the display 52.

Continuing to refer to FIG. 5, the second screw 30 is disposed perpendicular to the transmission rod 31. The second screw 30 outputs power to the transmission rod 31 in various ways. One possible way is that the second screw 30 includes threaded tooth and the third gear 35 is a spur gear. Another possible way is that the second screw 30 and the third gear 35 are both bevel gears.

The transmission rod 31 and the actuator rod 32 are disposed perpendicularly. In addition to outputting power through a bevel gear, the first bevel gear 34 being a threaded tooth and the second bevel gear 36 being a spur gear are further included.

It should be noted that the quantity of pushing member 33 may be one or more, and the quantity of actuating rod 32 is the same as the quantity of pushing member 33. In actual use, the pushing member 33 is connected with the display 52. In order to ensure that the display 52 may move smoothly, the quantity of the pushing member 33 is preferably even, which are symmetrically distributed on the transmission rod 31 with the third gear 35 as the center.

Figure 6:
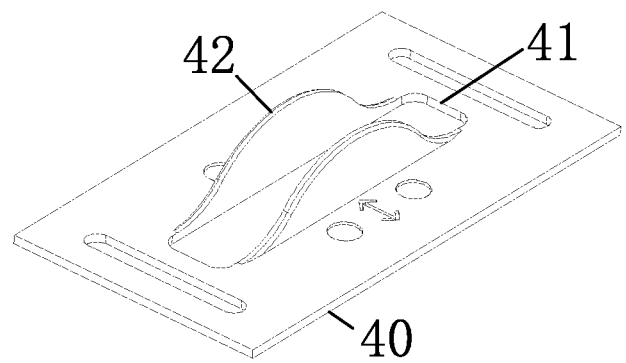

Referring to FIG. 1 and FIG. 6, in order to facilitate the user to switch the runner 10 to connect with the first screw 20 or the second screw 30, the adjustment apparatus further includes: a runner pushing plate 40.

One possible way of the runner pushing plate 40 is that a runner hole 41 is formed on the runner pushing plate 40, and two opposite sides of the runner hole 41 are provided with two pushing plates 42 in parallel. The runner 10 enters a gap between the two pushing plates 42 through the runner hole 41, and the runner 10 is parallel to the two pushing plates 42.

The user operates the runner 10 through the runner pushing plate 40 to switch the runner 10 to connect with the first screw 20 or the second screw 30. In order to facilitate the user to accurately know the connection state of the runner 10 during switching, the runner pushing plate 40 may be provided with an indicator mark, for example, indicator text or graphics is provided on two opposite sides of the runner hole 41.

Embodiment 2

Figure 7:
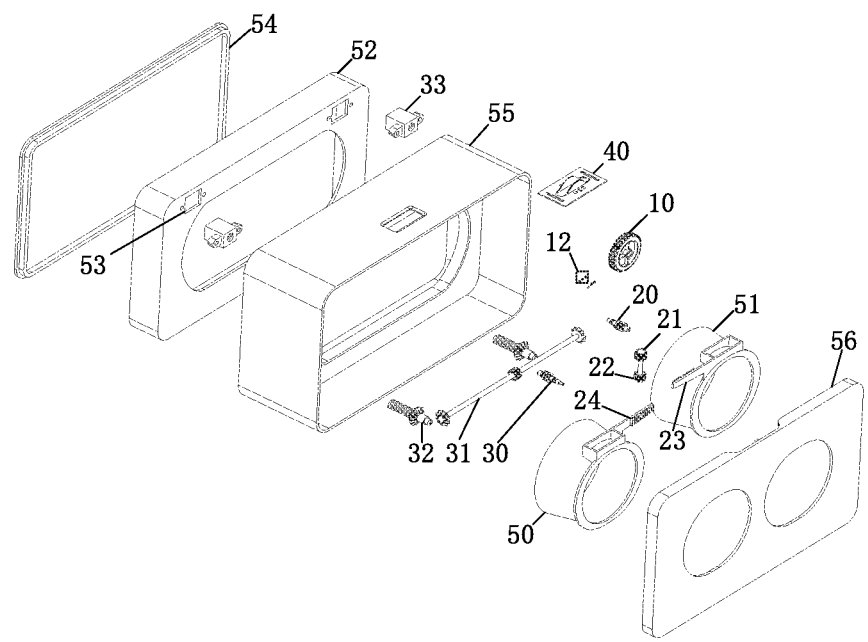

FIG. 7 is a schematic view of an exploded structure of a head-mounted display device according to the present disclosure, as shown in FIG. 7.

Correspondingly, the present disclosure further provides a head-mounted display device, which includes a first lens cone 50, a second lens cone 51, a display 52, and the adjustment apparatus as described above. Where, the first lens cone 50 and the second lens cone 51 are connected with the interpupillary distance adjustment actuator;

the display 52 is connected with the object distance adjustment actuator;

when the runner 10 drives the first screw 20 to rotate together, an interpupillary distance between the first lens cone 50 and the second lens cone 51 may be adjusted;

when the runner 10 drives the second screw 30 to rotate together, an object distance between the display 52 and the first lens cone 50 and the second lens cone 51 may be adjusted.

The following uses specific scenes to introduce how the head-mounted display device adjusts the interpupillary distance and object distance.

Figure 10:
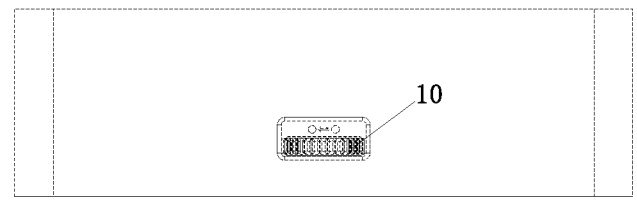
Figure 11:
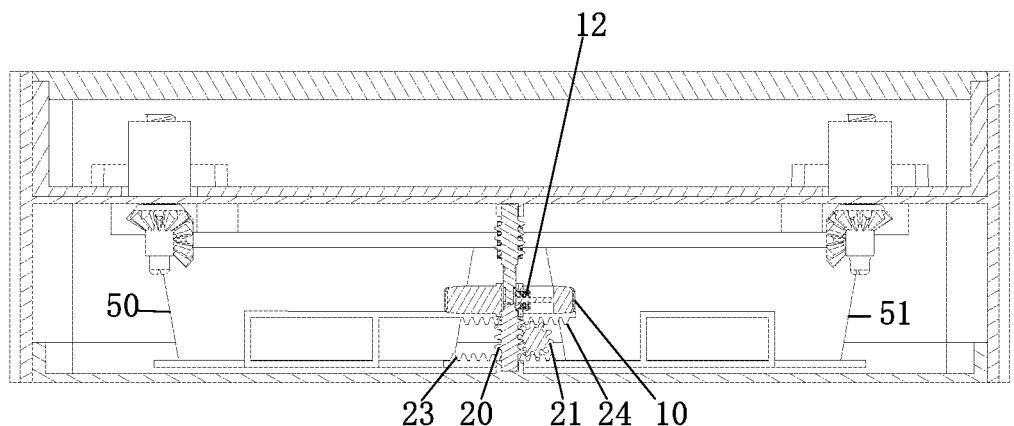

Referring to FIGS. 8 to 11, when it needs to adjust the interpupillary distance of the head-mounted display device, the runner 10 is pushed to the position shown in FIG. 10. At this time, referring to FIG. 11, the runner 10 is connected with the first screw 20, and the elastic insertion member 12 on the runner 10 extends into the groove 13. At this time, the runner 10 is rotated clockwise or counterclockwise, the runner 10 drives the first screw 20 to rotate, the first screw 20 drives the first gear 21 to rotate, and the second gear 22 rotates synchronously with the first gear 21. When the second gear 22 rotates in different directions, the first rack 23 and the second rack 24 are driven to move away from each other or towards to each other, such that the first rack 23 and the second rack 24 drive the first lens cone 50 and the second lens cone 51 to move away from each other or towards to each other. When the runner 10 is stopped rotating, the adjustment of the interpupillary distance is completed then.

When the object distance needs to be adjusted, refer to FIG. 8 and FIG. 9, FIG. 12 and FIG. 13, the runner 10 is pushed to the position shown in FIG. 12. At this time, referring to FIG. 13, the runner 10 is connected with the second screw 30, and the elastic insertion member 12 on the runner 10 extends into the groove 13. At this time, the runner 10 is rotated clockwise or counterclockwise, the runner 10 drives the second screw 30 to rotate, the second screw 30 drives the transmission rod 31 to rotate, the transmission rod 31 drives the actuator rod 32 to rotate. When the actuator rod 32 rotates in different directions, the pushing member 33 is driven to reciprocate along the axis direction of the actuator rod 32. The runner 10 is stopped rotating, the adjustment of the object distance is completed.

Continuing to refer to FIG. 7, the head-mounted display device further includes: a front case 54, a partition plate with a display port, a middle case 55 with an operation hole, and a rear case 56 with a mirror hole.

The partition plate separates the middle case 55 into a display cavity and a lens cone cavity, the front case 54 is connected with the middle case 55 and covers and fits the display cavity, and the rear case 56 is connected with the middle case 55 and covers and fits the lens cone cavity.

In the lens cone cavity, the partition plate is provided with a first connection portion, the rear case 56 is provided with a second connection portion, one end of the first screw 20 is connected with the first connection portion, the other end is sleeved with the second screw 30, the other end of the second screw 30 is connected with the second connection portion, and a control member part partly extends outward from the operation hole.

The display 52 is disposed in the display cavity and is movably connected with the middle case 55. A display surface of the display 52 faces the direction of the lens cone, and projects an image to the lens cone through the display port. The object distance adjustment actuator includes a pushing member 33. One possible way of pushing the member 33 and the display 52 is that the display 52 is provided with a connection groove 53 and the pushing member 33 is fixedly installed in the connection groove 53. The actuator rod 32 is connected with the pushing member 33 passing through the partition plate.

The first lens cone 50 and the second lens cone 51 are disposed in the lens cone cavity and movably connected with the middle case 55. When using the head-mounted display device, the user may use the first lens cone 50 and the second lens cone 51 in the lens cone cavity through the lens hole on the rear case 56, and view the image on the display 52 through the first lens cone 50 and the second lens cone 51.

Figure 8:
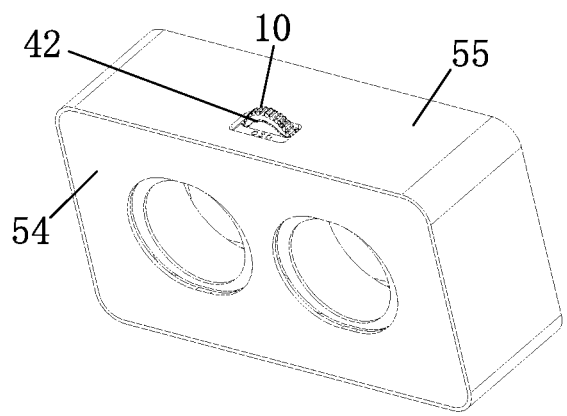

In addition, referring to FIG. 8, the adjustment apparatus includes a runner pushing plate 40. The runner pushing plate 40 is movably connected with the middle case 55. The two pushing plates 42 of the rotary push plate 40 extend outward from the operation hole. The user may operate the runner pushing plate 40 to make the runner 10 to connect with the first screw 20 or the second screw 30.

In the present disclosure, the head-mounted display device includes but is not limited to a head-mounted VR (short for Virtual Reality) device.

As a specific example, the head-mounted display device in the present disclosure includes, but is not limited to, an external type, an integrated type, or a shell type. The display in the shell type may be replaced by an external display device such as a mobile phone.

If it is an external type, the width of the head-mounted display device may not be greater than 220 mm, the thickness may not be greater than 130 mm, and the height may not be greater than 170 mm.

If it is an integral type, the width of the head-mounted display device may not be greater than 220 mm, the thickness may not be greater than 130 mm, and the height may not be greater than 170 mm.

If it is a shell type, the width of the head-mounted display device may not be greater than 220 mm, the thickness may not be greater than 120 mm, and the height may not be greater than 170 mm.

The direction parallel to the binocular line is the width direction, the horizontal visual direction is the thickness direction, and the vertical direction is the height direction.

For the implementation principle and technical effect of the apparatus in Embodiment 2 may refer to Embodiment 1. The features in Embodiment 1 and Embodiment 2 correspond to each other, and may refer to each other, and details are not repeated here.

In summary, the in the technical solution of the present disclosure, by switching the connects of the runner with the first screw or the second screw, the control of the interpupillary distance adjustment actuator and the object distance adjustment actuator may be switched, and the interpupillary distance adjustment or the object distance adjustment is achieved thereby. The adjustment mechanism provided by the present disclosure has a simple structure, takes up little space, and has few operation parts. The interpupillary distance adjustment or the object distance adjustment may be achieved by only one part. The operation process is simple and convenient, allowing users with different eye sights to use the head-mounted display device in a great convenience.

It should be noted that although the specific implementation of the present disclosure is described in detail with reference to the drawings, it should not be construed as limiting the scope of protection of the present disclosure. Within the scope described in the claims, various modifications and variations made by those skilled in the art without creative work still fall within the protection scope of the present disclosure.

The examples of the present disclosure are intended to explain the technical features of the present disclosure concisely, so that those skilled in the art can intuitively understand the technical features of the present disclosure, and are not intended to be an improper limitation of the present disclosure.

The apparatus embodiments described above are merely schematic, and the units described as separate components may or may not be physically separated. Those of ordinary skill in the art can understand and implement without creative labor.

The above description shows and describes several preferred embodiments of the present disclosure, but as mentioned above, it should be understood that the present disclosure is not limited to the form disclosed herein, and should not be regarded as an exclusion of other embodiments, but can be used for other combinations, modifications, and environments, and can be altered within the scope of the application concept described herein, through the teachings above or related technology or knowledge in the relevant field. Modifications and changes made by those skilled in the art without departing from the spirit and scope of the present disclosure shall all fall within the protection scope of the claims attached to the present disclosure.

What is claimed is:

1. An adjusting apparatus, comprising: a runner, an interpupillary distance adjustment component, and an object distance adjustment component; wherein,
    the interpupillary distance adjustment component comprises: a first screw, and an interpupillary distance adjustment actuator engaged with the first screw;
    the object distance adjustment component comprises: a second screw, an object distance adjustment actuator engaged with the second screw;
    a through hole is formed on a center of the runner, the through hole, the first screw and the second screw are coaxial, and the runner is capable of moving on the first screw and the second screw along an axis direction;
    when the runner moves onto the first screw, the runner is connected with the first screw through a connection structure, and the runner drives the first screw to rotate together; and when the runner moves onto the second screw, the runner is connected with the second screw through the connection structure, and the runner drives the second screw to rotate together.

2. The adjusting apparatus according to claim 1, wherein the connection structure comprises: an elastic insertion member and a groove cooperating with the elastic insert; wherein,
    the elastic insertion member is disposed on a hole wall of the through hole of the runner, and the first screw and the second screw are provided with the groove; or
    the first screw and the second screw are provided with the elastic insertion member, and the hole wall of the through hole of the runner is provided with the groove.

3. The adjusting apparatus according to claim 2, wherein, the elastic insertion member is an elastic pin or an elastic bead.

4. The adjusting apparatus according to claim 3, wherein, the interpupillary distance adjustment actuator comprises: a first gear, a second gear, a first rack, and a second rack; wherein,
    the first gear and the second gear are connected by a straight rod;
    the first gear is engaged with the first screw;
    the first rack is parallel to the second rack; and
    the second gear is located between the first rack and the second rack, and is engaged with the first rack and the second rack respectively.

5. The adjusting apparatus according to claim 3, wherein, the object distance adjustment actuator comprises: a transmission rod, an actuator rod and a pushing member;
    the transmission rod is provided with a first bevel gear and a third gear engaged with the second screw;
    the actuator rod is provided with a second bevel gear engaged with the first bevel gear;
    the pushing member is threadedly connected with the actuator rod; and
    the second screw drives the third gear to rotate, the third gear drives the first bevel gear to rotate, and the second bevel gear drives the actuator rod to rotate, such that the pushing member moves along an axis direction of the actuator rod.

6. The adjusting apparatus according to claim 3, further comprising: a runner pushing plate; wherein,
    a runner hole is formed on the runner pushing plate, and two opposite sides of the runner hole are provided with two pushing plates in parallel; and
    the runner enters a gap between the two pushing plates through the runner hole, and the runner is parallel to the two pushing plates.

7. The adjusting apparatus according to claim 2, wherein, the interpupillary distance adjustment actuator comprises: a first gear, a second gear, a first rack, and a second rack; wherein,
    the first gear and the second gear are connected by a straight rod;
    the first gear is engaged with the first screw;
    the first rack is parallel to the second rack; and
    the second gear is located between the first rack and the second rack, and is engaged with the first rack and the second rack respectively.

8. The adjusting apparatus according to claim 2, wherein, the object distance adjustment actuator comprises: a transmission rod, an actuator rod and a pushing member;
    the transmission rod is provided with a first bevel gear and a third gear engaged with the second screw;
    the actuator rod is provided with a second bevel gear engaged with the first bevel gear;
    the pushing member is threadedly connected with the actuator rod; and
    the second screw drives the third gear to rotate, the third gear drives the first bevel gear to rotate, and the second bevel gear drives the actuator rod to rotate, such that the pushing member moves along an axis direction of the actuator rod.

9. The adjusting apparatus according to claim 2, further comprising: a runner pushing plate; wherein,
    a runner hole is formed on the runner pushing plate, and two opposite sides of the runner hole are provided with two pushing plates in parallel; and
    the runner enters a gap between the two pushing plates through the runner hole, and the runner is parallel to the two pushing plates.

10. The adjusting apparatus according to claim 1, wherein, the interpupillary distance adjustment actuator comprises: a first gear, a second gear, a first rack, and a second rack; wherein,
    the first gear and the second gear are connected by a straight rod;
    the first gear is engaged with the first screw;
    the first rack is parallel to the second rack; and
    the second gear is located between the first rack and the second rack, and is engaged with the first rack and the second rack respectively.

11. The adjusting apparatus according to claim 1, wherein, the object distance adjustment actuator comprises: a transmission rod, an actuator rod and a pushing member;
    the transmission rod is provided with a first bevel gear and a third gear engaged with the second screw;
    the actuator rod is provided with a second bevel gear engaged with the first bevel gear;
    the pushing member is threadedly connected with the actuator rod; and
    the second screw drives the third gear to rotate, the third gear drives the first bevel gear to rotate, and the second bevel gear drives the actuator rod to rotate, such that the pushing member moves along an axis direction of the actuator rod.

12. The adjusting apparatus according to claim 1, further comprising: a runner pushing plate; wherein, a runner hole is formed on the runner pushing plate, and two opposite sides of the runner hole are provided with two pushing plates in parallel; and the runner enters a gap between the two pushing plates through the runner hole, and the runner is parallel to the two pushing plates.

13. A head-mounted display device, comprising a first lens cone, a second lens cone, a display and the adjustment apparatus according to claim 1; wherein, the first lens cone and the second lens cone are connected with the interpupillary distance adjustment actuator;

the display is connected with the object distance adjustment actuator;

when the runner drives the first screw to rotate together, an interpupillary distance between the first lens cone and the second lens cone is adjusted;

when the runner drives the second screw to rotate together, an object distance between the display and the first lens cone and the second lens cone is adjusted.

14. The head-mounted display device according to claim 13, wherein, the object distance adjustment actuator comprises a pushing member;

the display is provided with a connection groove, and the pushing member is fixedly installed in the connection groove.

15. The head-mounted display device according to claim 14, wherein, the adjusting apparatus comprises a runner pushing plate;

the runner pushing plate is movably connected with the middle case; and two pushing plates of the runner pushing plate extend outward from the operation hole.

16. The head-mounted display device according to claim 13, further comprising: a front case, a partition plate with a display port, a middle case with an operation hole, and a rear case with a mirror hole; wherein, the partition plate separates the middle case into a display cavity and a lens cone cavity, the front case is connected with the middle case and covers and fits the display cavity, and the rear case is connected with the middle case and covers and fits the lens cone cavity;

in the lens cone cavity, the partition plate is provided with a first connection portion, the rear case is provided with a second connection portion, one end of the first screw is connected with the first connection portion, the other end is sleeved with the second screw, the other end of the second screw is connected with the second connection portion, and a control part partly extends outward from the operation hole;

the display is disposed in the display cavity and movably connected with the middle case; and the first lens cone and the second lens cone are disposed in the lens cone cavity and movably connected with the middle case.

17. A head-mounted display device, comprising a first lens cone, a second lens cone, a display and the adjustment apparatus according to claim 2; wherein, the first lens cone and the second lens cone are connected with the interpupillary distance adjustment actuator;

the display is connected with the object distance adjustment actuator;

when the runner drives the first screw to rotate together, an interpupillary distance between the first lens cone and the second lens cone is adjusted;

when the runner drives the second screw to rotate together, an object distance between the display and the first lens cone and the second lens cone is adjusted.

18. A head-mounted display device, comprising a first lens cone, a second lens cone, a display and the adjustment apparatus according to claim 3; wherein, the first lens cone and the second lens cone are connected with the interpupillary distance adjustment actuator;

the display is connected with the object distance adjustment actuator;

when the runner drives the first screw to rotate together, an interpupillary distance between the first lens cone and the second lens cone is adjusted;

when the runner drives the second screw to rotate together, an object distance between the display and the first lens cone and the second lens cone is adjusted.

19. A head-mounted display device, comprising a first lens cone, a second lens cone, a display and the adjustment apparatus according to claim 10; wherein, the first lens cone and the second lens cone are connected with the interpupillary distance adjustment actuator;

the display is connected with the object distance adjustment actuator;

when the runner drives the first screw to rotate together, an interpupillary distance between the first lens cone and the second lens cone is adjusted;

when the runner drives the second screw to rotate together, an object distance between the display and the first lens cone and the second lens cone is adjusted.

20. A head-mounted display device, comprising a first lens cone, a second lens cone, a display and the adjustment apparatus according to claim 11; wherein, the first lens cone and the second lens cone are connected with the interpupillary distance adjustment actuator;

the display is connected with the object distance adjustment actuator;

when the runner drives the first screw to rotate together, an interpupillary distance between the first lens cone and the second lens cone is adjusted;

when the runner drives the second screw to rotate together, an object distance between the display and the first lens cone and the second lens cone is adjusted.

\* \* \* \* \*